United States Patent Office 3,394,153
Patented July 23, 1968

3,394,153
PROCESS FOR THE PREPARATION OF d,l-8-DE-HYDROESTRONE, AND INTERMEDIATES OBTAINED THEREFROM
Luciano Re, South Orange, N.J., assignor to Merck & Co., Inc., Rahway, N.J., a corporation of New Jersey
No Drawing. Filed Aug. 18, 1965, Ser. No. 480,792
14 Claims. (Cl. 260—397.45)

ABSTRACT OF THE DISCLOSURE

The invention disclosed herein is concerned with a novel synthesis of d,l-8-dehydroestrone and intermediate compounds useful in the synthesis thereof. More particularly, this invention relates to a synthesis of d,l-8-dehydroestrone starting with 1,2,3,4,7,8-hexahydro-6-lower alkoxy-naphthalene-1-one or 6-lower alkoxy-1-tetralone. In this synthesis, the 6-lower alkoxy-1-tetralone is reacted with crotyl-triphenyl phosphonium bromide to form 1,2,3,4-tetrahydro-6-lower alkoxy-1-(2-butenylidene)-naphthalene which, by reaction with succinic anhydride, is converted to d,l-8,11,14-trisdehydroestrone. The latter compound is then reacted with hydrogen to produce d,l-dehydroestrone. d,l-8-dehydroestrone may be converted to d,l-estrone according to the procedure in the publication in Steroids, volume 4, page 31 (1964). The novel synthesis of this invention may be schematically represented as follows:

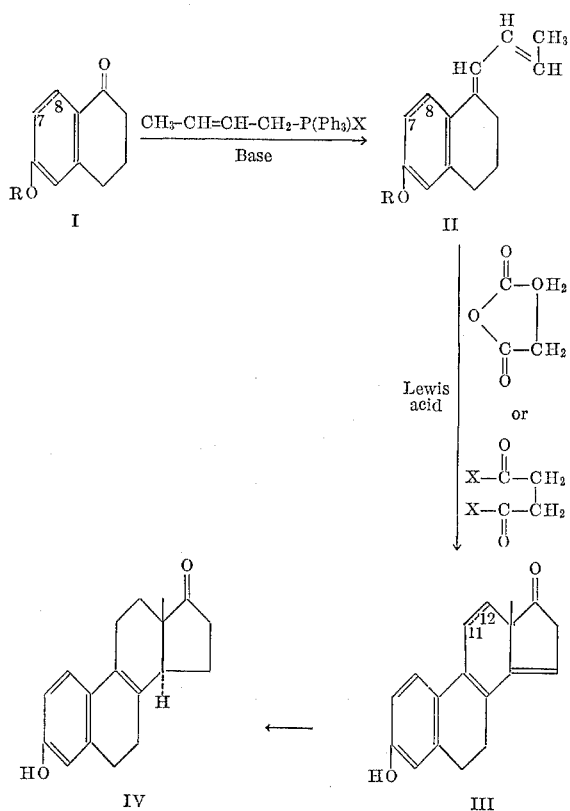

wherein the dotted line in Compounds I and II between the C–7 and C–8 carbon atoms and the dotted line between the C–11 and C–12 carbon atoms of Compound III indicate these bonds are single or double, R is a lower alkyl substituent preferable having not more than five carbon atoms, and X is chlorine or bromine.

The first step in the novel synthesis of this invention is the reaction of 1,2,3,4,7,8-hexahydro-6-lower alkoxy-naphthalene-1-one or 6-lower alkoxy-1-tetralone (Compound I) with crotyl-triphenyl phosphonium bromide or chloride to provide 1,2,3,4,7,8-hexahydro-6-lower alkoxy-1-(2-butenylidene)-naphthalene or 1,2,3,4-tetrahydro-6-lower alkoxy-1-(2-butenylidene)-naphthalene (Compound II), which are reacted in the second step with succinic anhydride or succinyl dihalide, such as succinyl dichloride or dibromide, in the presence of a Lewis acid, such as anhydrous aluminum chloride, hydrogen fluoride or boron trifluoride, to provide d,l-8,14-bisdehydroestrone or d,l-8,11,14-trisdehydroestrone, respectively (Compound III). In the third step, d,l-8,14-bisdehydroestrone and d,l-8,11,14-trisdehydroestrone are each hydrogenated to provide d,l-8-dehydroestrone (Compound IV).

The reaction between Compound I and crotyl-triphenyl phosphonium bromide or chloride is conveniently accomplished by slowly adding with stirring a solution of Compound I in methanol to a mixture prepared by adding a solution of crotyl-triphenyl phosphonium bromide or chloride in methanol to a solution of a potassium or sodium alcoholate of a lower aliphatic alcohol, preferably sodium methylate, prepared by dissolving sodium in dry methanol and stirring for about one hour after addition of the phosphonium bromide is complete. After addition of Compound I is complete, stirring is continued while the reaction mixture is under a blanket of nitrogen for one hour. To isolate Compound II from the reaction mixture, the solvent is removed by distillation under reduced pressure and the residue is extracted with petroleum ether. The petroleum ether extract is washed with water until neutral and dried over anhydrous magnesium sulfate. The petroleum ether solution is concentrated to dryness by distillation under reduced pressure. The residue is Compound II.

The reaction between Compound II and succinic anhydride or succinyl dibromide or dichloride is accomplished by adding Compound II with stirring to a suspension of succinic anhydride or succinyl dichloride or dibromide and anhydrous Lewis acid, preferably anhydrous aluminum chloride in an organic solvent such as benzene, xylene or toluene or 1,2-dichloroethane containing a small amount of hydroquinone. After addition is complete, the mixture is heated at about 85° C. for about two hours. To isolate Compound III from the reaction mixture, the solution is cooled and poured into an iced aqueous hydrochloric acid solution. The solvent layer is separated from the resulting mixture and the aqueous layer is extracted with chloroform. The chloroform extract is combined with the solvent layer and the combined solution is washed with dilute aqueous sodium bicarbonate solution until neutral, washed with water and dried over magnesium sulfate. The solvents are removed by distillation under reduced pressure. The residue is Compound III and may be purified by chromatography.

Compound III is conveniently hydrogenated to produce d,l-8-dehydroestrone by the hydrogenation of a solution of Compound III in an organic solvent, such as tetrahydrofuran, containing 2% palladised calcium carbonate. Hydrogenation is conducted at room temperature and atmospheric pressure until one molecular equivalent of hydrogen is absorbed when Compound III has a single bond between the C–11 and C–12 carbon atoms, and hydrogenated until two molecular equivalents of hydrogen are absorbed when Compound III has a double bond between the C–11 and C–12 carbon atoms. d,l-8-dehydroestrone may be isolated from the reaction mixture by filtering to remove the catalyst and removal of the organic solvent by distillation under reduced pressure.

d,l-8-dihydroestrone may be readily converted to d,l-estrone by known procedure, such as the isomerization of the $\Delta^8$-double bond to a $\Delta^{9(11)}$-double bond by refluxing a solution of d,l-8-dehydroestrone and tetrahydrofuran containing hydrochloric acid for about one hour, isolating the resulting d,l-9(11)-dehydroestrone and hydrogenating the d,l-9(11)-dehydroestrone in solution in an inert organic solvent, such as tetrahydrofuran, in the presence of a catalytic amount of 10% palladized calcium carbonate.

1,2,3,4,7,8-hexahydro-6-lower alkoxy-naphthalene-1-one may readily be prepared from 1,2,3,4,5,8-hexahydro-6-lower alkoxy-naphthalene-1-one. This is readily accomplished by stirring a solution of 1,2,3,4,5,8-hexahydro-6-lower alkoxy-naphthalene-1-one in methanol containing a strong base, such as sodium hydroxide or potassium hydroxide, at room temperature for about one hour. 1,2,3,4,7,8-hexahydro-6-lower alkoxy-naphthalene-1-one may be isolated from the reaction mixture by adding water, extracting with ether, washing the ether extract with water, drying the ether extract over anhydrous magnesium sulfate and removing the ether by distillation under reduced pressure. The residual oil is 1,2,3,4,7,8-hexahydro-6-lower alkoxy-naphthalene-1-one.

The following examples illustrate methods of carrying out the present invention, but it is to be understood that these examples are given for purposes of illustration and not of limitation.

Example 1.—1,2,3,4,7,8-hexahydro-6-methoxy-1-(2-butenylidene)-naphthalene

A solution of 3.97 g. of crotyl-triphenyl phosphonium bromide in 20 ml. of methanol is added with stirring to a sodium methylate solution prepared by dissolving 0.23 g. of metallic sodium in 10 ml. of anhydrous methanol. The reaction mixture is stirred for one hour after addition is complete and a solution of 1.78 g. of 1,2,3,4,7,8-hexahydro-6-methoxy-naphthalene-1-one in 20 ml. of methanol is then added with stirring. After addition is complete the reaction mixture is stirred under a blanket of nitrogen for one hour. The solvent is removed from the reaction mixture by distillation under reduced pressure and the residue is extracted with petroleum ether. The petroleum ether extract is washed with water until neutral and dried over anhydrous magnesium sulfate. The petroleum ether is removed by distillation under reduced pressure. The residue is 1,2,3,4,7,8-hexahydro-6-methoxy-1-(2-butenylidene)-naphthalene.

Example 2.—1,2,3,4-tetrahydro-6-methoxy-1-(2-butenylidene)-naphthalene

A solution of 3.97 g. of crotyl-triphenyl phosphonium bromide in 20 ml. of methanol is added with stirring to a sodium methylate solution prepared by dissolving 0.23 g. of metallic sodium in 10 ml. of anhydrous methanol. The reaction mixture is stirred for one hour after addition is complete. A solution of 1.76 g. of 6-methoxy-1-tetralone in 20 ml. of methanol is then added with stirring. After addition is complete the reaction mixture is stirred under a blanket of nitrogen for one hour. The solvent is removed from the reaction mixture by distillation under reduced pressure and the residue is extracted with petroleum ether. The petroleum ether extract is washed with water until neutral and dried over anhydrous magnesium sulfate. The petroleum ether is removed by distillation under reduced pressure. The residue is 1,2,3,4-tetrahydro-6-methoxy-1-(2-butenylidene)-naphthalene.

Example 3.—d,l-8,14-bisdehydroestrone 21.6 grams of 1,2,3,4,7,8-hexahydro-6-methoxy-1-(2-butenylidene)-naphthalene dissolved in 30 ml. of 1,2-dichloroethane is added slowly with stirring to a suspension of 10 g. of succinic anhydride, 26.7 g. of anhydrous aluminum chloride and 0.1 g. of hydroquinone in 70 ml. of 1,2-dichloroethane. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is d,l-8,14-bisdehydroestrone and it is purified by chromatographing on neutral alumina.

Example 4.—d,l-8,11,14-trisdehydroestrone 21.4 grams of 1,2,3,4-tetrahydro-6-methoxy-1-(2-butenylidene)-naphthalene dissolved in 30 ml. of 1,2-dichloroethane is added slowly with stirring to a suspension of 10 g. of succinic anhydride, 26.7 g. of anhydrous aluminum chloride and 0.1 g. of hydroquinone in 70 ml. of 1,2-dichloroethane. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is d,l-8,11,14-trisdehydroestrone and it is purified by chromatographing on neutral alumina.

Example 5.—d,l-8,14-bisdehydroestrone 21.6 grams of 1,2,3,4,7,8-hexahydro-6-methoxy-1-(2-butenylidene)-naphthalene dissolved in 30 ml. of 1,2-dichloroethane is added slowly with stirring to a suspension of 15.5 g. of succinyl chloride, 26.7 g. of anhydrous aluminum chloride and 0.1 g. of hydroquinone in 70 ml. of 1,2-dichloroethane. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is d,l-8,14-bisdehydroestrone and it is purified by chromatographing on neutral alumina.

Example 6.—d,l-8,11,14-trisdehydroestrone 21.4 grams of 1,2,3,4-tetrahydro-6-methoxy-1-(2-butenylidene)-naphthalene dissolved in 30 ml. of 1,2-dichloroethane are added slowly with stirring to a suspension of 15.5 g. of succinyl chloride, 26.7 g. of anhydrous aluminum chloride and 1.1 g. of hydroquinone in 70 ml. of 1,2-dichloroethane. After addition is complete, the mixture is refluxed for two hours, cooled to room temperature, and poured into a mixture of 250 ml. of 2 N hydrochloric acid and 250 g. of ice. The mixture is stirred for 30 minutes and the organic layer is separated. The aqueous layer is extracted three times with chloroform and the chloroform extracts are combined with the organic layer. The combined organic solution is washed with dilute aqueous sodium bicarbonate solution until neutral and then washed with water and dried over magnesium sulfate. The solvent is removed by distillation under reduced pressure. The residue is d,l-8,11,14-trisdehydroestrone and it is purified by chromatographing on neutral alumina.

Example 7.—d,l-8-dehydroestrone

A solution of 2 g. of d,l-8,11,14-trisdehydroestrone in 100 ml. of tetrahydrofuran containing 1 g. of 2% palladised calcium carbonate is hydrogenated at room temperature and atmospheric pressure until two equivalents of hydrogen are absorbed. The solution is filtered to removed the catalyst and the solvent is removed by distillation under reduced pressure. The residue is d,l-8-dehydroestrone and it is purified by crystallization from methanol.

Example 8.—1,2,3,4,7,8-hexahydro-6-methoxy-naphthalene-1-one

A solution of 1 g. of 1,2,3,4,5,8-hexahydro-6-methoxy-naphthalene-1-one in 10 ml. of methanol containing 0.5 ml. of 3 N sodium hydroxide is stirred for one hour at room temperature. Fifty milliliters of water are added to the reaction mixture and the resulting mixture is extracted three times with 50 ml. portions of ether. The ether extracts are combined, washed with water and dried over anhydrous magnesium sulfate. The ether is removed by distillation under reduced pressure. The residue is 1,2,3,4,7,8-hexahydro-6-methoxy-naphthalene-1-one.

Various changes and modifications may be made in carrying out the present invention without departing from the spirit and scope thereof. Insofar as these changes and modifications are within the purview of the annexed claims, they are to be considered as part of the invention.

What is claimed is:

1. A process for the preparation of a compound of the formula:

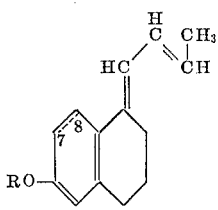

wherein R is a lower alkyl substituent and the dotted line between the 7 and 8 carbon atoms indicates that bond is a single or double bond, which comprises reacting a compound of the formula:

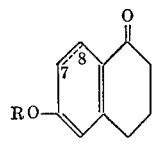

wherein R and the dotted line between the 7 and 8 carbon atoms have the same significance as above, with crotyl-triphenyl phosphonium chloride or bromide in solution in a lower aliphatic alcohol containing a sodium or potassium alcoholate of a lower aliphatic alcohol.

2. A process for the preparation of a compound of the formula:

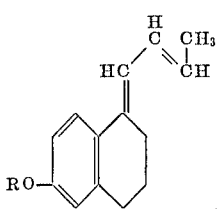

wherein R is a lower alkyl substituent, which comprises reacting a compound of the formula:

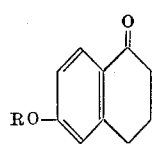

wherein R has the same significance as above, with crotyl-triphenyl phosphonium chloride or bromide in solution in a lower aliphatic alcohol containing a sodium or potassium alcoholate of a lower aliphatic alcohol.

3. A process for the preparation of a compound of the formula:

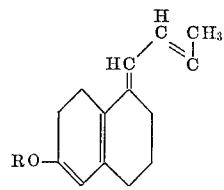

wherein R is a lower alkyl substituent, which comprises reacting a compound of the formula:

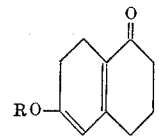

wherein R has the same significance as above, with crotyl phosphonium chloride or bromide in solution in a lower aliphatic alcohol containing a sodium or potassium alcoholate of a lower aliphatic alcohol.

4. A process for the preparation of a compound of the formula:

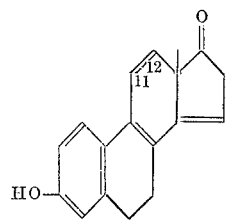

wherein the dotted line between the 11 and 12 carbon atoms indicates that bond is a single or double bond, which comprises reacting in an inert organic solvent a compound of the formula:

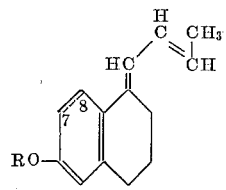

wherein R is a lower alkyl substituent and the dotted line between the 7 and 8 carbon atoms indicates that bond is a single or double bond, with succinic anhydride or succinyl dichloride or dibromide with a Lewis acid in the presence of a small amount of hydroquinone.

5. A process for the preparation of a compound of the formula:

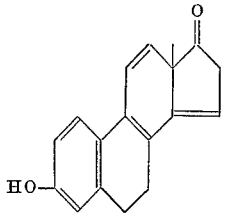

which comprises reacting in an inert organic solvent a compound of the formula:

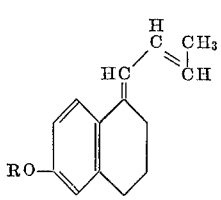

wherein R is a lower alkyl substituent with succinic anhydride or succinyl dichloride or dibromide and a Lewis acid in the presence of a small amount of hydroquinone.

6. A process for the preparation of a compound of the formula:

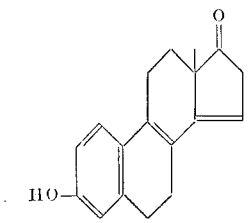

which comprises reacting in an inert organic solvent a compound of the formula:

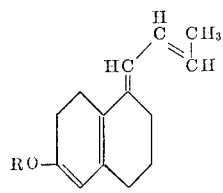

wherein R is a lower alkyl substituent with succinic anhydride or succinyl dichloride or dibromide and a Lewis acid in the presence of a small amount of hydroquinone.

7. A process for the preparation of d,l-8-dehydroestrone which comprises the steps of reacting a compound of the formula:

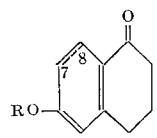

wherein R is a lower alkyl substituent and the dotted line between the 7 and 8 carbon atoms indicates that bond is a single or double bond, with crotyl-triphenyl phosphonium chloride or bromide in solution in a lower aliphatic alcohol containing a sodium or potassium alcoholate of a lower aliphatic alcohol, to provide a compound of the formula:

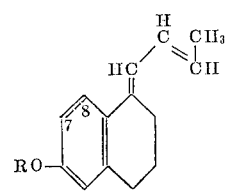

wherein R and the dotted line have the same significance as above; reacting the latter compound in an inert organic solvent with succinic anhydride or succinyl dichloride or dibromide and a Lewis acid in the presence of a small amount of hydroquinone, to provide a compound of the formula:

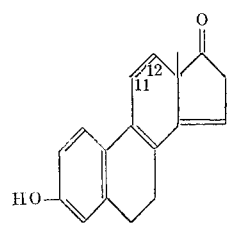

wherein the dotted line between the 11 and 12 carbon atoms indicates that bond is a single or double bond; and hydrogenating the latter compound.

8. A process for the preparation of d,l-8-dehydroestrone which comprises the steps of reacting a compound of the formula:

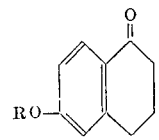

wherein R is a lower alkyl substituent, with crotyl-triphenyl phosphonium chloride or bromide in solution in a lower aliphatic alcohol containing a sodium or potassium alcoholate of a lower aliphatic alcohol, to provide a compound of the formula:

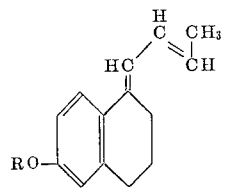

wherein R has the same significance as above; and reacting the latter compound in an inert organic solvent with succinic anhydride or succinyl dichloride or dibromide and a Lewis acid in the presence of a small amount of hydroquinone, to provide a compound of the formula:

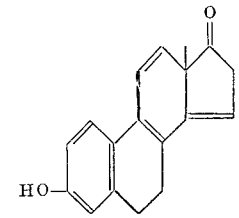

and hydrogenating the latter compound until two molecular equivalents of hydrogen are absorbed.

9. A process for the preparation of d,l-8-dehydroestrone which comprises the steps of reacting a compound of the formula:

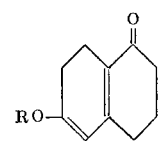

wherein R is a lower alkyl substituent, with crotyl-triphenyl phosphonium chloride or bromide in solution in a lower aliphatic alcohol containing a sodium or potassium alcoholate of a lower aliphatic alcohol, to provide a compound of the formula:

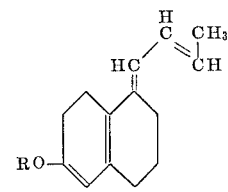

wherein R has the same significance as above; and reacting the latter compound in an inert organic solvent with succinic anhydride or succinyl dichloride or dibromide and a Lewis acid in the presence of a small amount of hydroquinone, to provide a compound of the formula:

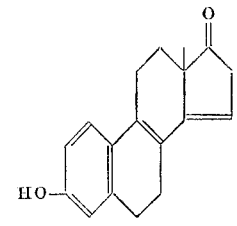

and hydrogenating the latter compound until one molecular equivalent of hydrogen is absorbed.

10. A compound of the formula:

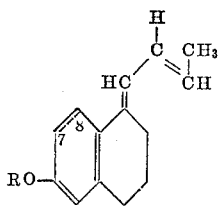

wherein R is a lower alkyl substituent and the dotted line between 7 and 8 carbon atoms indicates that bond is a single or double bond.

11. A compound of the formula:

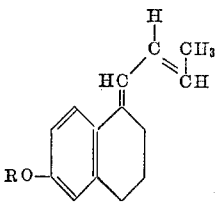

wherein R is a lower alkyl substituent.

12. A compound according to claim 11 in which R is methyl.

13. A compound of the formula:

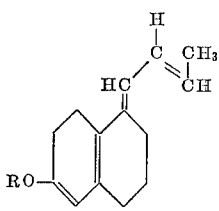

wherein R is a lower alkyl substituent.

14. A compound according to claim 13 in which R is methyl.

References Cited

UNITED STATES PATENTS 3,261,830   7/1966   Bowers et al. _____ 260—239.55

ELBERT L. ROBERTS, *Primary Examiner.*